United States Patent [19]

Iwaoka et al.

[11] Patent Number: 5,125,471
[45] Date of Patent: Jun. 30, 1992

[54] AUTOMATIC CAR-SPEED CONTROLLER

[75] Inventors: Toshio Iwaoka; Yuichi Yamaguchi; Akihiko Tsukahara; Tsutomu Danzaki, all of Yokohama, Japan

[73] Assignee: Jidosha Denki Kogyo K.K., Kanagawa, Japan

[21] Appl. No.: 563,644

[22] Filed: Aug. 7, 1990

[30] Foreign Application Priority Data

Aug. 8, 1989 [JP] Japan .................. 1-205179

[51] Int. Cl.⁵ ............................ B60K 31/04
[52] U.S. Cl. .......................... 180/179; 123/352; 180/170; 364/426.04
[58] Field of Search ............ 180/179, 177, 170; 123/352; 364/426.04

[56] References Cited

U.S. PATENT DOCUMENTS

| 4,885,692 | 12/1987 | Kurihara et al. | 180/179 |
| 4,921,063 | 5/1990 | Masuda | 180/178 |
| 4,934,476 | 6/1990 | Hyodo | 180/177 |
| 5,014,201 | 5/1991 | Tsukahara et al. | 180/170 |

FOREIGN PATENT DOCUMENTS 279141 12/1987 Japan ................ 180/170

Primary Examiner—Eric D. Culbreth
Attorney, Agent, or Firm—Sughrue, Mion, Zinn, Macpeak & Seas

[57] ABSTRACT

An automatic car-speed controller is provided with a car-speed sensor, a command switch, a car-speed memory, an actuator, a control circuit for controlling the actuator, and a prohibition circuit for preventing a driving motor of the actuator to rotate in the accelerating direction at the time of cancelling car-speed control or occurrence of some abnormality in the control circuit or the like, or a discrimination circuit for detecting whether a first limit switch is normal or not without driving a throttle in the opening direction.

1 Claim, 7 Drawing Sheets

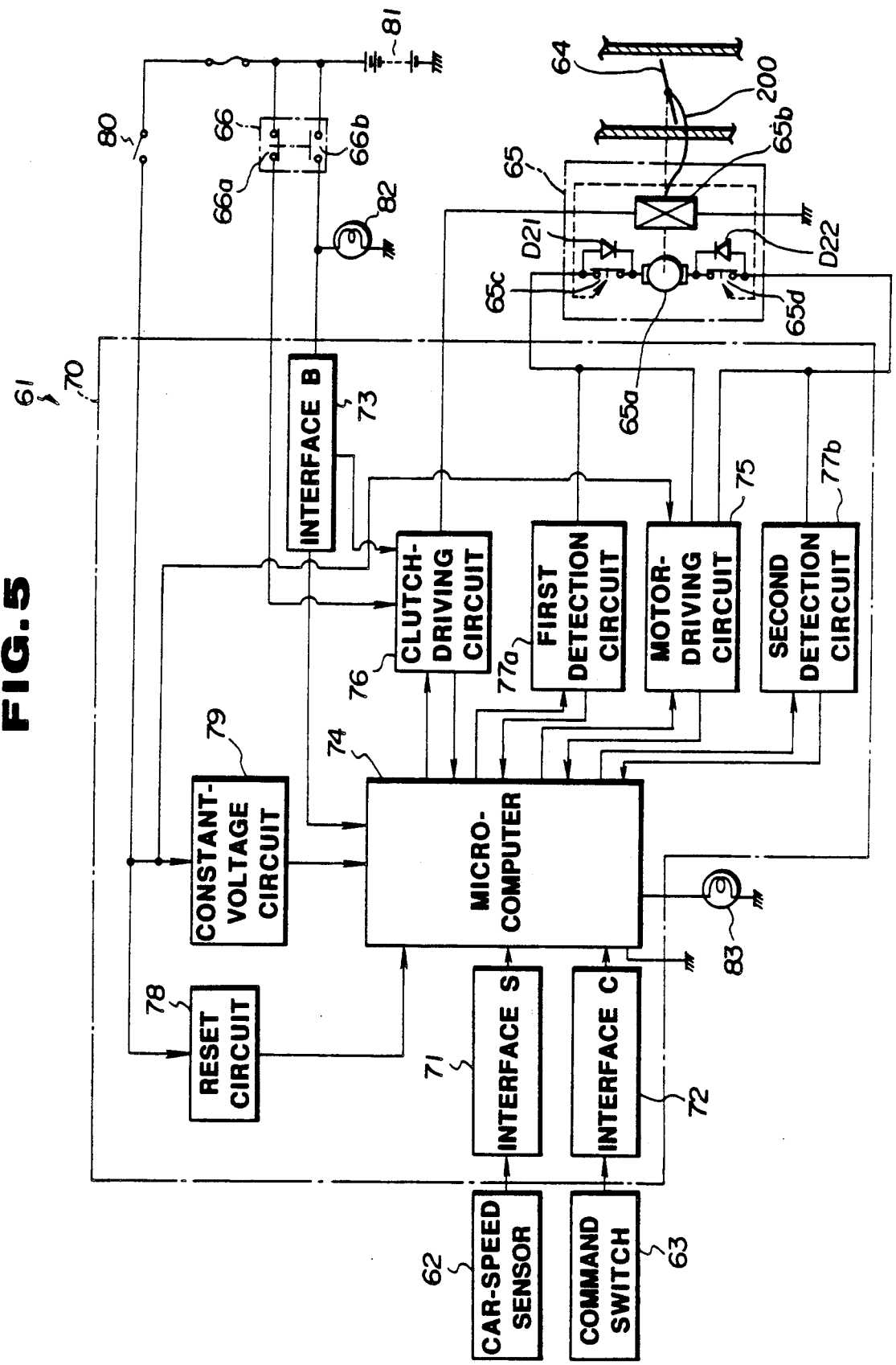

AUTOMATIC CAR-SPEED CONTROLLER

BACKGROUND OF THE INVENTION

1. Field of the Invention

This invention relates to an automatic car-speed controller used for controlling the travelling speed of a motor vehicle at a set point automatically.

2. Description of the Prior Art

Heretofore, there have been many types of such automatic car-speed controllers. Among them, for example, there has been an automatic car-speed controller comprising a car-speed sensor for outputting car-speed data proportional to an actual car-speed, a command switch for outputting a cruise command signal, an actuator for driving a throttle by rotation of a driving motor through an electromagnetic clutch, a motor-driving circuit for rotating the driving motor of said actuator in the forward and reverse directions and a clutch-driving circuit for switching said electromagnetic clutch on or off, and provided with a car-speed memorizing means for memorizing the car-speed data of said car-speed sensor in response to an operation (ON-operation or OFF-operation) of said command switch and a control means for controlling said respective driving circuits in accordance with difference between actual car-speed and memorized car-speed in a microcomputer.

In said automatic car-speed controller, by operating a setting switch of the command switch, the car-speed at the time of the operation is memorized by the car-speed memorizing means in the microcomputer. The control means actuates the motor-driving circuit and the clutch-driving circuit according to the difference between actual car-speed and memorized car-speed, thereby making the electromagnetic clutch of the actuator into an excited state and driving the throttle in the opening or closing direction by the rotation of the driving motor of the actuator through said electromagnetic clutch, the actual car-speed being controlled into said memorized car-speed so as to travel at a constant speed. Upon operating a brake pedal at the time of traveling at the constant speed, the car-speed control is cancelled by inputting a cancel signal generated according to the operation of said brake pedal into the control means in the microcomputer, the motor-driving circuit stops the rotation of the driving motor in the actuator according to a cancel signal from the control means and the electromagnetic clutch is made into a non-excited state by the clutch-driving circuit, whereby the system is cancelled.

However, in the conventional automatic car-speed controller described above, it is impossible to declare that there is not any possibility that some abnormality may arise in the microcomputer from inconceivable factors such as a remarkably large overcurrent, unforeseen damage caused by radio waves, and the like during the car-speed controlling operation. Therefore, an abnormality-detecting circuit is provided for cancelling the system by detecting the abnormality of the microcomputer and making the electromagnetic clutch into the non-excited state. However, the motor vehicle may be accelerated if the operation of the electromagnetic clutch is abnormal during disconnection due to trouble such as fusion bonding, for example, and the driving motor of the actuator is driven in the opening direction of the throttle as a result of the microcomputer trouble. When the driver notices the abnormality of the car-speed control and operates the brake pedal, the stopping force is applied on the vehicle, however that may be a problem in that the vehicle is accelerated again upon discontinuing the brake operation because the connection of said electromagnetic clutch is not interrupted.

In the automatic car-speed controller as described above, said actuator is provided with two limit switches for detecting the full-opened position and the full-closed position of the throttle respectively, and is so designed as to prevent the driving motor from burning out by making respective limit switches into an open state when said throttle arrives at the full-opened position or the full-closed position.

In the aforementioned conventional automatic car-speed controller, when the throttle stays at the full-closed position, it is impossible to confirm the conductivity of the limit switch for detecting the full-closed position of the throttle because said limit switch is in the open state when the throttle is at the full-closed position. Therefore, the conductivity of said limit switch is confirmed at the state in which the throttle is driven temporarily in the opening direction by the control means through the motor-driving circuit. However, there is a problem in that it is impossible to drive the throttle in the closing direction by the actuator when said limit switch does not come into the conductive state due to some trouble.

SUMMARY OF THE INVENTION

The present invention is made in view of the aforementioned problems of the prior art and an object of the invention is to provide an automatic car-speed controller economically which is capable of stopping the rotation of the driving motor of the actuator as a minimum when the car-speed control is cancelled or some abnormality arises in the microcomputer at the time of car-speed control. Another object of this invention is to provide an automatic car-speed controller which is capable of confirming the conductivity of the limit switch of the actuator for detecting the full-closed position of the throttle at the state in which the throttle is not driven in the opening direction.

The construction of the automatic car-speed controller according to a first embodiment of the present invention for attaining the above-mentioned abject is comprised of a car-speed sensor for outputting car-speed data proportional to an actual car-speed, a command switch for outputting a cruise command signal, a car-speed memorizing means for memorizing the car-speed data of said car-speed sensor in response to an operation of said command switch, a motor driven actuator provided with a driving motor for driving a throttle by rotation of said driving motor through an electromagnetic clutch, a motor-driving means for rotating the driving motor of said actuator in the forward and reverse directions, a clutch-driving means for switching said electromagnetic clutch on or off, a control means for controlling said respective driving means in accordance with a difference between actual car-speed and memorized car-speed, and a prohibition means for preventing the rotation of the driving motor of said actuator in the accelerating direction when the car-speed control is cancelled or some abnormality arises in said car-speed memorizing means, the control means, the respective driving means or the electromagnetic clutch.

The automatic car-speed controller according to a first embodiment of the present invention having the aforementioned construction is so designed that the prohibition means detects the abnormality in the car-speed memorizing means, the control means, respective driving means and the electromagnetic clutch or the cancelling of the car-speed control, and prevents the motor-driving means from rotating the driving motor of the actuator in the accelerating direction independently of the disconnection of the electromagnetic clutch of the actuator. Accordingly, the throttle is never driven in the accelerating direction as a minimum when some abnormality arises in the car-speed memorizing means, the control means, the respective driving means or the electromagnetic clutch, or the car-speed control is cancelled.

The construction of the automatic car-speed controller according to a second embodiment of the present invention for attaining the above-mentioned object is comprised of a car-speed sensor for outputting car-speed data proportional to an actual car-speed, a command switch for outputting a cruise command signal, a car-speed memorizing means for memorizing the car-speed data of said car-speed sensor in response to an operation of said command switch, a motor driven actuator provided with a driving motor for driving a throttle by rotation of said driving motor through an electromagnetic clutch, and provided with a first limit switch to detect the full-closed position of the throttle and a second limit switch to detect the full-opened position of said throttle into the full-closed or full-opened position with said respective limit switches, a control means for controlling said actuator in accordance with the difference between actual car-speed and memorized car-speed, and a discrimination means for detecting whether the first limit switch to detect the full-closed position of the throttle is normal or not by driving said actuator within a range in which said throttle remains at the full-closed position owing to slack between the actuator and the throttle.

In the automatic car-speed controller according to the second embodiment of the present invention having the aforementioned construction, there is a region in which the throttle cannot be moved from the full-closed position is spite of the fact that the actuator is driven in the opening direction of the throttle in some degree because of slack caused in the connection between the throttle and the actuator through a throttle wire.

Therefore, when the control means drives the actuator in the opening direction of the throttle within a range in which said throttle remains at the full-closed position, the first limit switch of the actuator for detecting the full-closed position of the throttle is switched over from the open state into the conductive state if said first limit switch is normal. Accordingly, the discrimination means is so designed as to confirm the conductivity of the first limit switch by detecting the state of said limit switch without driving the throttle in the opening direction.

BRIEF DESCRIPTION OF THE DRAWINGS

FIG. 5 is a diagram illustrating the circuit configuration of the second embodiment of the automatic car-speed controller according to this invention;

DESCRIPTION OF THE PREFERRED EMBODIMENTS

Embodiments of the automatic car-speed controller according to this invention will be described below on the basis of the drawings.

Figure 1:
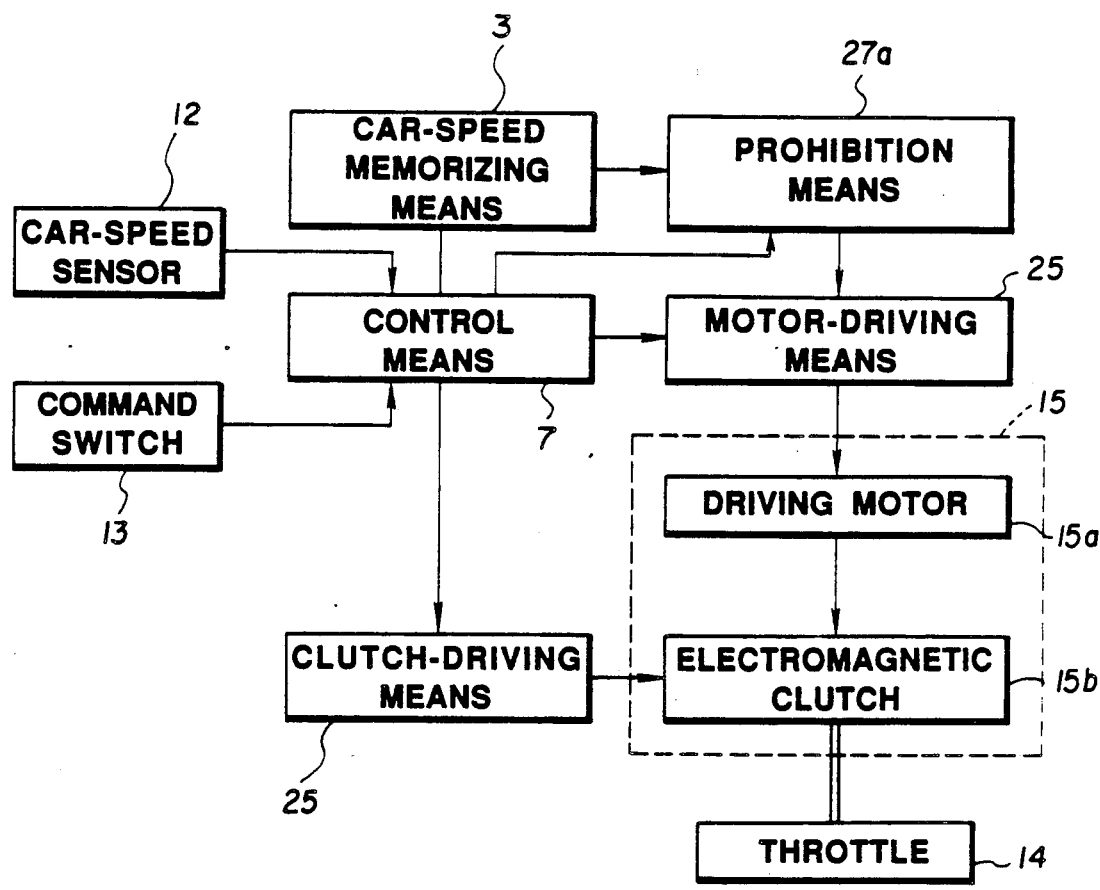
FIG. 1 is a functional block diagram showing the basic arrangement of the automatic car-speed controller according to a first embodiment of the present invention.
Figure 2:
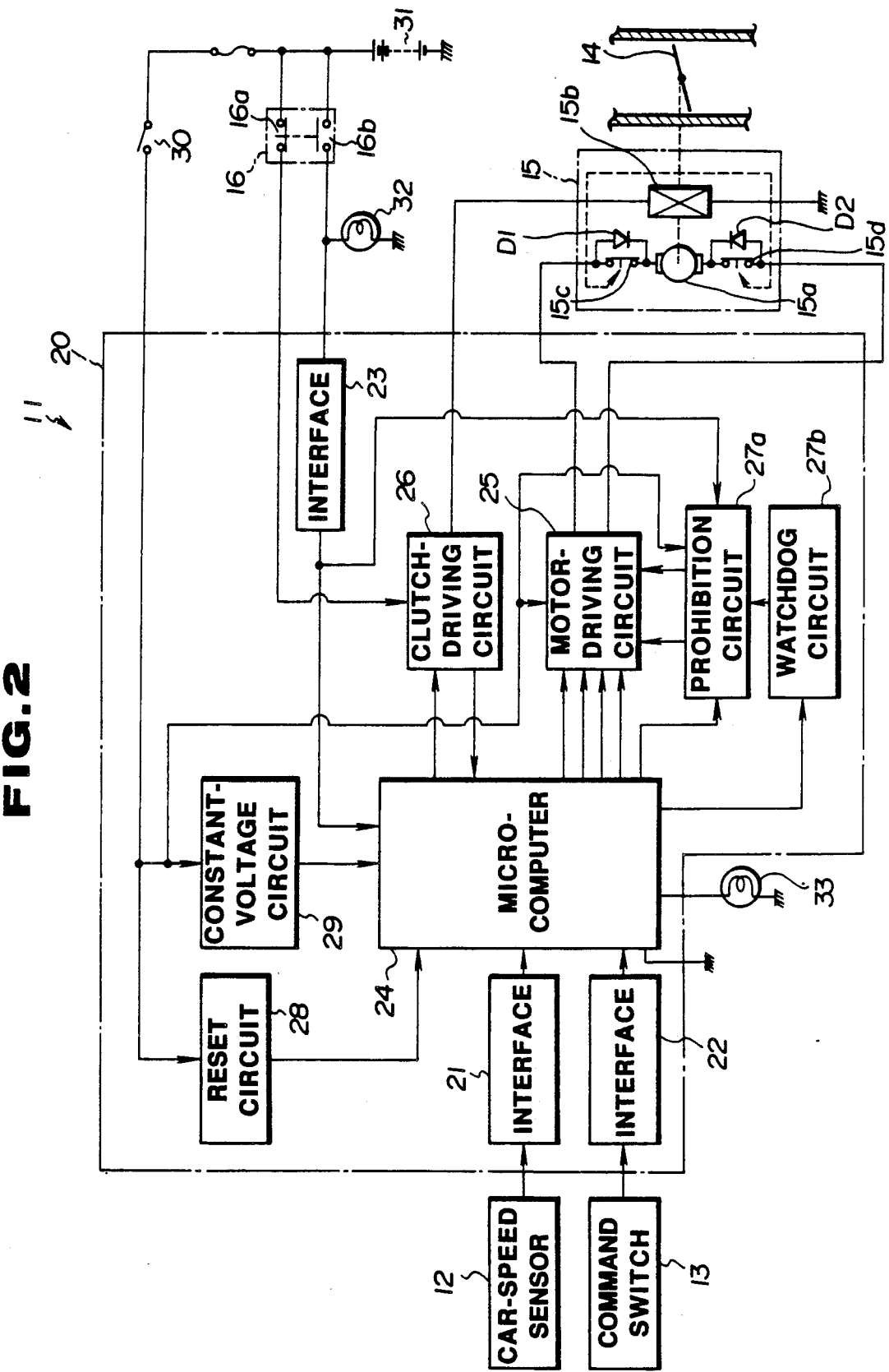
FIG. 2 is a diagram illustrating the circuit configuration of the first embodiment of the automatic car-speed controller according to this invention.
Figure 3:
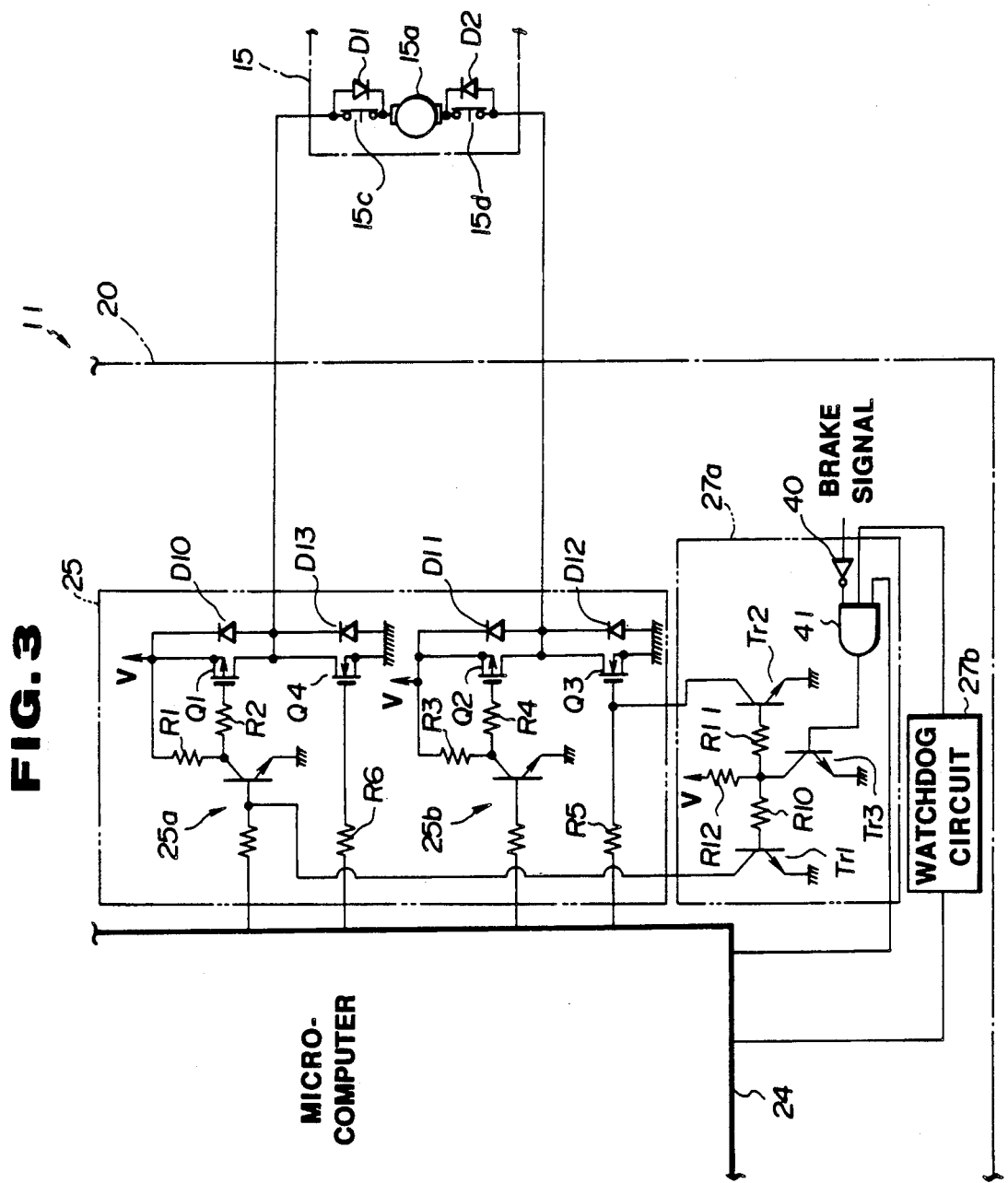
FIG. 3 is a diagram illustrating the circuit configuration of the motor-driving circuit and the prohibition circuit shown in FIG. 2.

A first embodiment of the automatic car-speed controller is shown in FIGS. 1-3 with FIG. 2 showing the circuit configuration of an automatic car-speed controller 11.

The automatic car-speed controller 11 is provided with a car-speed sensor 12 for outputting car-speed data proportional to an actual car-speed, a command switch 13 for outputting a cruise command signal, a motor driven actuator 15 for driving a throttle 14 of a motor vehicle and a brake switch 16 linked to operation of a brake pedal (not shown), and has a circuit configuration provided with a microcomputer 24 input with respective operation signals from said car-speed sensor 12, the command switch 13 and the brake switch 16 through respective interface circuits 21, 22 and 23, a motor-driving circuit 25 for driving a driving motor 15a, which will be described later, of the actuator 15 in the opening and closing directions of the throttle 14 (that is, in the forward and reverse rotational directions) under control of said microcomputer 24, a clutch-driving circuit 26 for switching an electromagnetic clutch 15b which will be described later of the actuator 15 on and off under control of said microcomputer 24, a prohibition circuit 27a for preventing the operation of the motor-driving circuit 25 in the opening direction of the throttle 14 at the time of occurrence of abnormality in the microcomputer 24 and cancelling the car-speed control, a watchdog circuit 27b for detecting a watchdog pulse signal generated from said microcomputer 24 working in normal, and for outputting an output signal "1" in the normal case and outputting an output signal "0" in the abnormal case, a reset circuit 28 and a constant-voltage circuit 29 in a control part 20.

The automatic car-speed controller 11 is provided with a main switch 30, a battery 31 loaded on the vehicle, a brake lamp 32 and a cruise lamp 33 in the outside of said control part 20. Furthermore, said command switch 13 includes a setting switch, a resuming switch, an accelerating switch and so on.

The actuator 15 is provided with the driving motor 15a to be driven in the forward and reverse rotational directions by said motor-driving circuit 25, the electromagnetic clutch 15b for transmitting the rotation of said driving motor 15a to the throttle 14 through a reduction gear (not shown) by said clutch-driving circuit 26, a first limit switch 15c (which comes into the OFF-state when the throttle 14 arrives at the full-closed state of said throttle 14 at the corresponding position in said actuator 15), a second limit switch 15d (which comes into the OFF-state when the throttle 14 arrives at the full-opened position) for detecting the full-opened state of said throttle 14 at the corresponding position in said actuator 15, a diode D1 for bypassing said first limit switch 15c and for passing the electric current to the driving motor 15a in the opening direction of the throttle 14 when the throttle 14 is in the full-closed state, and a diode D2 for bypassing said second limit switch 15d and for passing the electric current to the driving motor 15a in the closing direction of the throttle 14 when the throttle 14 is in the full-opened state. Additionally, the throttle 14 is connected with the actuator 15 through a throttle wire or the like.

The brake switch 16 is provided with a normal-closed first switch 16a and a normal-opened second switch 16b, and is so structured that the first switch 16a comes into the open state by linking with the operation of the brake pedal (not shown) and outputs a cancelling signal to the clutch-driving circuit 26, and the second switch 16b comes into the closed state and outputs a cancelling signal to the microcomputer 24 and the prohibition circuit 27a through the interface circuit 23.

The microcomputer 24 houses the car-speed memorizing means 3 for memorizing the car-speed at the time of OFF-operation of the setting switch of said command switch 13 subsequent to the ON-operation of said setting switch (which may be designed so as to memorize the car-speed at the time of ON-operation), and the control means 7 shown in FIG. 1 for making the electromagnetic clutch 15b of the actuator 15 into an excited state by working the clutch-driving circuit 26 in response to the OFF-operation of the setting switch of said command switch 13, and for comparing the memorized car-speed by said car-speed memorizing means with the actual car-speed from the car-speed sensor 12 and controlling the car-speed so as to match the actual car-speed with the memorized car-speed by working the motor-driving circuit 25 in response to the difference between the car-speeds.

The motor-driving circuit 25, as shown in FIG. 3, has a circuit configuration provided with a p-type field effect transistor (hereinafter referred to as "FET") Q1 for supplying a current in the forward rotational direction (that is, in the opening direction of the throttle 14) to the driving motor 15a in the actuator 15, a p-type FET Q2 for supplying a current in the reverse rotational direction (that is, in the closing direction of the throttle 14) to the driving motor 15a in the actuator 15, a switching part 25a for actuating said FET Q1 according to a forwardly motor-driving signal output from the control means in the microcomputer 24, a switching part 25b for actuating said FET Q2 according to a reverse motor-driving signal output form the control means in the microcomputer 24, a n-type FET Q3 for grounding the driving motor 15a in said actuator 15 and rotating said driving motor 15a in the forward direction at the time of working of said FET Q1, a n-type FET Q4 for grounding the driving motor 15a in said actuator 15 and rotating said driving motor 15a in the reverse direction at the time of working of said FET Q2, resistors R1 and R2 for regulating an input current of said switching part 25a, resistors R3 and R4 for regulating an input current of said switch part 25b, a resistor R5 for regulating the gate voltage of said FET Q3, a resistor R6 for regulating the gate voltage of said GET Q4, a diode D10 for protecting said FET Q1 from back electromotive force, a diode D11 for protecting said FET Q2 from the back electromotive force, a diode D12 for protecting said FET Q3 from the back electromotive force and a diode D13 for protecting said FET Q4 from the back electromotive force. The motor-driving circuit 25 is so structured as to control the forward and reverse rotation of the driving motor 15a in the actuator 15 according to the command from the microcomputer 24.

The prohibition circuit 27a has a circuit configuration comprising, as shown in FIG. 3, a forward rotation-prohibition transistor Tr1 for making the switching part 25a of said motor-driving circuit 24 into the non-working state by charging with electricity, a forward rotational ground-prohibition transistor Tr2 for making the n-type FET Q3 of said motor-driving circuit 25 into the non-working state by charging with electricity, a working-prohibition transistor Tr3 for making the base voltage of said transistors Tr1 and Tr2 by charging with electricity, a NOT circuit 40 for inverting a brake signal output form the first switch 16a, of the brake switch 16, an AND circuit 41 for actuating said transistor Tr3 when an output signal from said NOT circuit 40, an output signal from the watchdog circuit 27b and a driving signal to drive the electromagnetic clutch 15b of the actuator 15 from the microcomputer 24 are "1" entirely, and for making said transistor Tr3 into the non-working state when at least one of the respective signals is "0", and resistors R10 to R12.

Next, an explanation is given on the action of the automatic car-speed controller 11 having the above-mentioned configuration.

First of all, the main switch 30 is switched into the ON-state in order to operate the automatic car-speed controller 11. At this time, the car-speed sensor 12 outputs a pulse signal, that is the car-speed data proportional to the actual car-speed, to the microcomputer 24 in the control part 20. The pulse signal is sampled for a specified time such that the microcomputer 24 detects the pulse number proportional to the car-speed. In this state, the cruise lamp 33 is lit at the time of cancelling the setting signal subsequent to the input of the setting signal into the control means of the microcomputer 24 by the setting switch of the command switch 13, the pulse number according to the car-speed at this time is memorized by the car-speed memorizing means in the microcomputer 24. The control means in the microcomputer 24 actuates the clutch-driving circuit 26 and makes the electromagnetic clutch 15a in the actuator 15 into an excited state, so that the throttle 14 is enabled to be opened and closed by the rotation of the driving motor 15a in the actuator 15.

In this state, a motor driving signal in response to the pulse number memorized in the car-speed memorizing means in the microcomputer 24 is output from the control means in the microcomputer 24, said motor driving signal actuates the switching part 25a and the n-type FET Q3 in the motor-driving circuit 24, further actuates the p-type FET Q1 and rotates the driving motor 15a in the actuator 15 in the forward direction, so that the throttle 14 is driven and maintained at the proper position through the electromagnetic clutch 15b and the throttle wire (not shown). Thereafter, the throttle 14 is maintained at the proper position without operating the accelerator pedal, the motor vehicle can travel at a constant traveling speed.

Concerning the automatic car-speed control at this time, the control means in the microcomputer 24 compares the pulse number proportional to the actual car-speed from the car-speed sensor 12 with the pulse number memorized by the car-speed memorizing means in the microcomputer 24 (memorized car-speed), outputs the motor driving signal in response to the difference between said actual and memorized car-speeds into the motor-driving circuit 25, actuates the switching part 25a and the n-type FET Q3, or the switching part 25b and the n-type FET Q4 in said motor-driving circuit 25, and rotates the driving motor 15a in the actuator 15 in the opening or closing direction of the throttle 14 in order to maintain the car-speed constant. In the prohibition circuit 27a, the output signal from the watchdog circuit 27b is "1", the driving signal of the electromagnetic clutch 15b of the actuator 15 is "1" since said electromagnetic clutch 15b is in the excited state, and the brake signal is "1" through the NOT circuit 40 since the first switch 16a of the brake switch 16 is in the OFF-state. Therefore, the output signal from the AND circuit 41 is "1", the transistor Tr3 is actuated, whereby the respective base voltage of the transistors Tr1 and Tr2 come into non-working states. Accordingly, it is possible to actuate the switching part 25a and n-type FET Q3 of the motor-driving circuit 25 by the control signal from the microcomputer 24.

Upon cancelling said car-speed control by operating the brake pedal, the first switch 16a of the brake switch 16 comes into OFF-state, (which is in ON-state normally) and the second switch 16b comes into ON-state (which is in OFF-state normally) linking with said brake pedal-operation.

Thus, the cancelling signal is input into the microcomputer 24 through the interface 23 in response to the ON-state of the second switch 16b of the brake switch 16. At the same time, the brake signal changes from "1" into "0" through the NOT circuit 40 in response to the OFF-state of the first switch 16a of the brake switch 16, so that the output signal from the AND circuit 41 of the prohibition circuit 27a changes from "1" into "0", the transistor Tr3 comes into the non-working state and the switching part 25a and the n-type FET Q3 are made into the non-working states by the working of respective transistors TR1 and Tr2. Therefore, the driving motor 15a of the actuator 15 is never driven in the opening direction of the throttle 14, the rotation of the driving motor 15a in the opening direction is discontinued without a time lag, and the driving motor 15a of the actuator 15 is driven in the closing direction of the throttle according to the control signal from the microcomputer 24.

In the case in which the microcomputer 24 falls into an abnormal state by an overcurrent or the like at the time of the above-described car-speed control, the output signal from the watchdog circuit 27b changes into "0" from "1" because the output of the watchdog pulse signal from said microcomputer 24 becomes extinct. Thereby the output signal from the AND circuit 41 of the prohibition circuit 27a changes into "0" from "1", and the switching part 25a and the n-type FET Q3 of the motor-driving circuit 25 are made into the non-working states by the respective transistors Tr1 And Tr2, so that the rotation of the driving motor 15a of the actuator 15 in the opening direction of the throttle 14 is prohibited. Therefore, the driving motor 15a is never driven in the opening direction of the throttle 114 even if some abnormality arises in the microcomputer 24 under the car-speed control.

Even when the electromagnetic clutch 15b of the actuator cannot enter into the non-excited state due to trouble in the watchdog circuit 27a in addition to the abnormality of the microcomputer 24, or when the electromagnetic clutch 15b of the actuator 15 is bonded due to partial fusion, the vehicle is never accelerated suddenly by discontinuing the operation of the brake pedal and it is possible to slowdown the traveling speed in accordance with intention of the driver because the driving motor 15a is never driven in the opening direction of the throttle 14 by the prohibition circuit 27a.

FIGS. 4-8 show another embodiment of the automatic car-speed controller according to this invention with FIG. 5 showing a circuit configuration of an automatic car-speed controller 61.

The automatic car-speed controller 61 is provided with a car-speed sensor 62 for outputting car-speed data proportional to the actual car-speed, a command switch 63 for outputting a cruise command signal, a motor driven actuator 65 for driving a throttle 64 of a motor vehicle, and a brake switch 66 linked to operation of a brake pedal (not shown), and has a circuit configuration provided with a microcomputer 74 input with respective operating signals from said car-speed sensor 62, the command switch 63 and the brake switch 66 through respect interface circuits 71, 72 and 73, a motor-driving circuit 75 for driving a driving motor 65a, which will be described later, of the actuator 65 in the opening and closing directions of the throttle 64 (that is, in the forward and reverse rotational directions) under control of said microcomputer 74, a clutch-driving circuit 76 for switching an electromagnetic clutch 65b, which will be described later, of the actuator 65 on or off under control of said microcomputer 74, a first detection circuit 77a and a second detection circuit 77b for detecting a condition of the actuator 65 under control of said microcomputer 74, a rest circuit 78 and a constant-voltage circuit 79 in a control part 70.

The automatic car-speed controller 61 is provided with a main switch 80, a battery 81 carried by the vehicle, a brake lamp 82 and a cruise lamp 83 on the outside of said control part 70. Furthermore, said command switch 63 includes a setting switch, a resuming switch, an accelerating switch and so on similar to the aforementioned controller 11.

The actuator 65 is provided with a driving motor 65a to be driven in the forward and reverse directions by said motor-driving circuit 75, an electromagnetic clutch 65b for transmitting the rotation of said driving motor 65a to the throttle 64 through a reduction gear (not shown) by said clutch-driving circuit 76, a first limit switch 65c for detecting the full-closed state of said throttle 64 at the corresponding position in said actuator 65 and shutting off the electric current to the driving motor 65a in the actuator 65, a second limit switch 65d for detecting the full-opened state of said throttle 65 at the corresponding position in said actuator 65 and shutting off the electric current to the driving motor 65a in the actuator 65, a diode D21 for bypassing said first limit switch 65c and for passing the electric current to the driving motor 65a in the opening direction of the throttle 64 when the throttle 64 is in the full-closed state, and a diode D22 for bypassing said second limit switch 65d and for passing the electric current to the driving motor 65a in the closing direction of the throttle 64 when the throttle 64 is in the full-opened state. Additionally, the throttle 64 is connected with the actuator 65 through a throttle wire or the like.

The brake switch 66 is provided with a normal-closed first switch 66a and a normal-opened second switch 66b, and is so structured that the first switch 66a comes into the open state by linking with the operation of the brake pedal (not shown) and outputs a cancelling signal to the clutch-driving circuit 76, and the second switch 66b comes into the close state and outputs a cancelling signal to the microcomputer 74 and the clutch-driving circuit 76 through the interface circuit 73.

Figure 4:
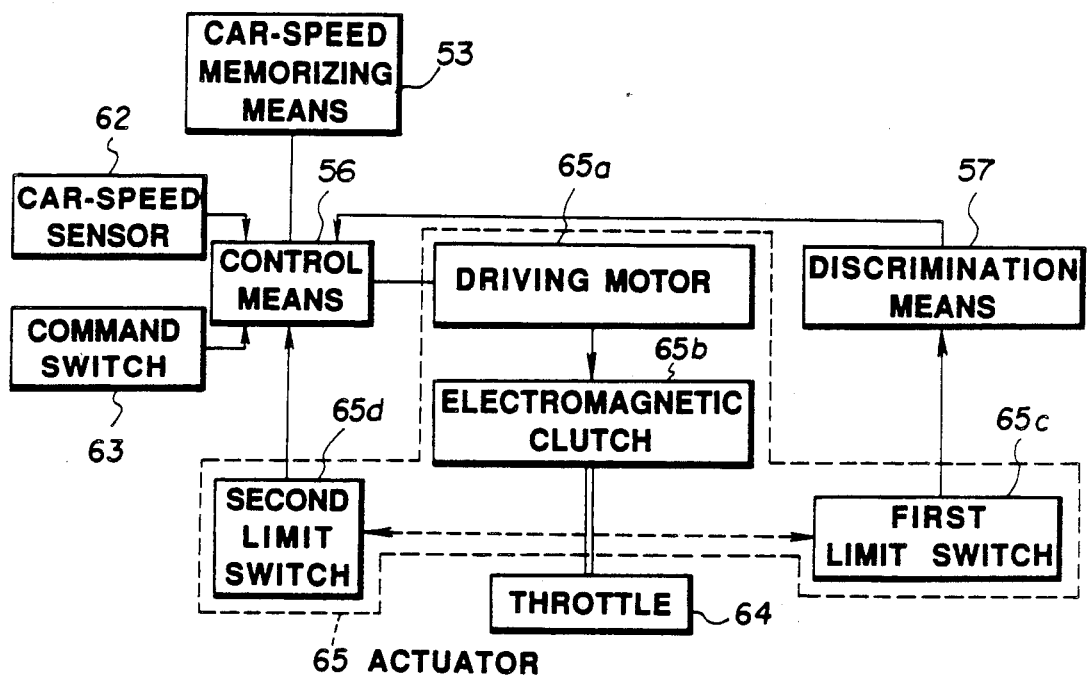
FIG. 4 is a functional block diagram showing the basic arrangement of the automatic car-speed controller according to a second embodiment of the present invention.

The microcomputer 74 houses the car-speed memorizing means 53 shown in FIG. 4 for memorizing the car-speed at the time of OFF-operation of the setting switch of said command switch 63 subsequent to the ON-operation of said setting switch (which may be designed so as to memorize the car-speed at the time of ON-operation), the discrimination means 57 shown in FIG. 4 for making the electromagnetic clutch 65b of the actuator 65 into the excited state through said clutch-driving circuit 75 at the time of ON-operation of the main switch 80 and driving the driving motor 65a of the actuator 65 within a range in which said throttle 64 remains at the full-closed position, and for detecting whether the first limit switch 65c is normal or not by detecting whether or not said first limit switch 65c changes into the conductive state from the open state through the first detection circuit 77a, and the control means 56 shown in FIG. 4 for comparing the memorized car-speed of the car-speed memorizing means with the actual car-speed from the car-speed sensor 62 and controlling the car-speed so as to match the actual car-speed with the memorized car-speed by working the motor-driving circuit 75 and the clutch-driving circuit 76 in accordance with the difference between the car-speeds, and for making said actuator 65 into the non-working state when said discrimination means detects an abnormality of said first limit switch 65c.

Figure 6:
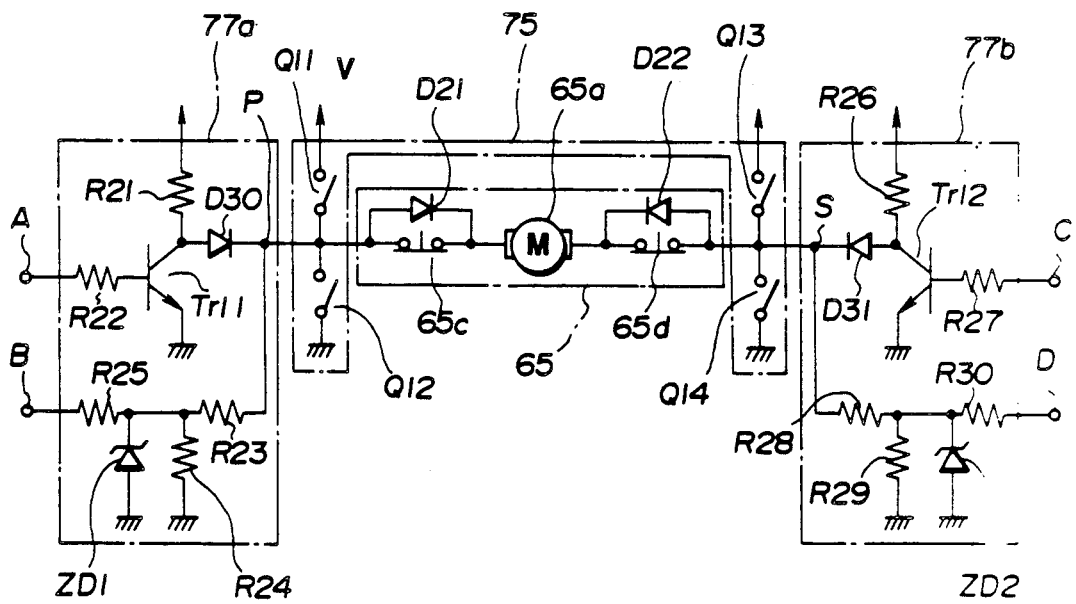
FIG. 6 is a schematic diagram illustrating the circuitry of the actuator, the motor-driving circuit, the first and second detecting circuits shown in FIG. 5.

The first detection circuit 77a is provided with a npn-type transistor Tr11, resistors R21 to R25, a diode D30 and a zener diode ZD1 as shown in FIG. 6, and is so structured as to make the microcomputer 74 detect the working of the first limit switch 65c of the actuator 65, switching part Q11 for supplying the electric current to the driving motor 65a in the forward rotational direction and switching part Q12 for grounding the driving motor 65a and rotating it in the reverse direction in the motor-driving circuit, which are connected with the microcomputer 74, from the voltage level at point P through a terminal B by actuating the transistor Tr11 with the microcomputer 74 through a terminal A.

The second detection circuit 77b is provided with a npn-type transistor Tr12, resistors R26 to R30, a diode D31 and a zener diode ZD2 as shown in FIG. 6, and is so structured as to make the microcomputer 74 detect the working of the second limit switch 65d of the actuator 65, a switching part Q13 for supplying the electric current to the driving motor 65a in the reverse rotational direction and a switching part Q14 for grounding said driving motor 65a and rotating it in the forward direction in said motor-driving circuit 75 which are connected with the microcomputer 74 from the voltage level at point S through a terminal D by actuating the transistor Tr12 with the microcomputer 74 through a terminal C. In addition, said respective switching parts Q11 to Q14 of the motor-driving circuit 75 disposed in an H-bridge connection are shown with equivalent circuits, so that field effect transistors (FET), relays or the like may be used as switching parts Q11 to Q14.

Figure 7:
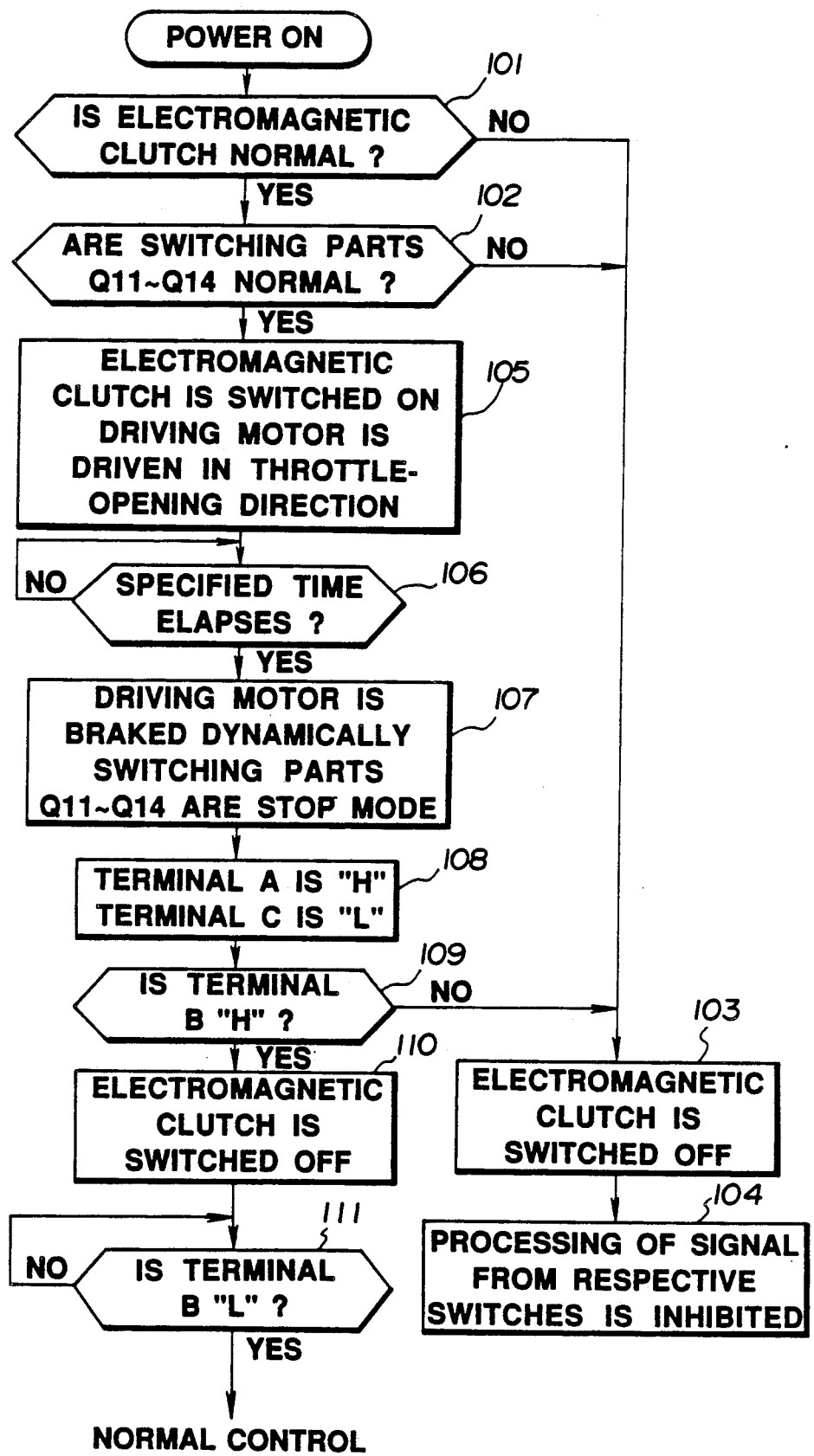
FIG. 7 is a flowchart showing the program of the microcomputer shown in FIG. 5.
Figure 8:
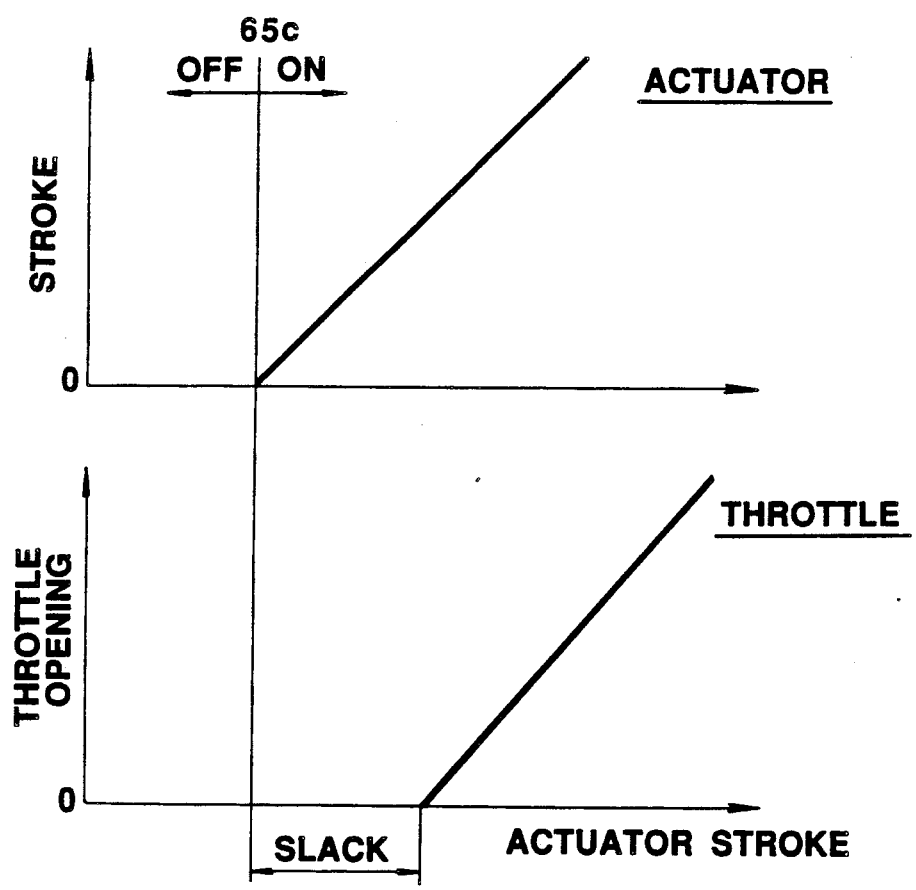
FIG. 8 is a graph illustrating the relationship of the working time lag between the actuator and the throttle.

Next, the explanation is given with respect to the operation of the automatic car-speed controller 61 having the aforementioned configuration with reference to FIGS. 6-8.

First of all, the main switch 80 is switched into the ON-state in order to operate the automatic car-speed controller 61. At this time, the car-speed sensor 62 outputs a pulse signal, that is, car-speed data proportional to the actual car-speed, to the microcomputer 64 in the control part 70. The pulse signal is sampled for a specified time such that the microcomputer 64 detects the pulse number proportional to the car-speed.

Hereupon, a program shown in FIG. 7 starts working by the ON-operation of the main switch 80 as described above.

At step 101 in FIG. 7, judgement is made as to whether the electromagnetic clutch 65b of the actuator 65 is normal or not. If said electromagnetic clutch 65B is normal (YES), judgement is made concerning the working of respective switching parts Q11 to Q14 at the succeeding step 102.

If some abnormality is detected at step 101 or step 102 (NO), the electromagnetic clutch 65b is made into the non-excited state at step 104 and processing for the signal output from the respective switches of the command switch 63 is inhibited at succeeding step 105.

If the respective switching parts Q11 to Q14 are normal (YES) in said step 102, the electromagnetic clutch 65b is made into the excited state and the driving motor 65a is rotated in the opening direction of the throttle 64 at step 105.

At step 106, judgement is made as to whether a specified time elapses or not. Since there is slack in the connection between the actuator 65 and the throttle 64 through the throttle wire 200, the specified time corresponds to a time lag caused by said slack between the actuator 65 and the throttle 64 as shown in FIG. 8.

Therefore, if the specified time does not elapse at step 106 (NO), control returns repeatedly until the specified time passes. When the specified time elapses, the first limit switch 65c is assumed to be in the conductive state without driving the throttle 64 in the opening direction, and the respective switching parts Q11 to Q14 of the motor-driving circuit 75 are made into stop modes after braking the driving motor 65a by dynamic braking at step 107.

At step 108, the terminal A of the first detection circuit 77a is at the "H" level and the terminal C of the second detection circuit 77b is at the "L" level. At step 109, judgement is made as to whether the terminal B of first detection circuit 77a is at the "H" level or not. If said terminal B of the first detection circuit 77a is not at the "H" level (NO) at said step 109, it is determined that the first limit switch 65c breaks down in the open state or the second limit switch 65d and the diode D22 break down at the same time in the open states and the aforementioned processing at step 103 and step 104 are executed.

If terminal B of the first detection circuit 77a is at the "H" level (YES) art step 109, it is determined that said first limit switch 65c is in the conductive state, the electromagnetic clutch 65b is made into the non-excited state at step 101 and, judgement is made as to whether terminal B of the first detection circuit 77a changes to the "L" level or not at succeeding step 11.

If terminal B is not at the "L" level at step 111 (NO), it is determined that said first limit switch 65c is not in the conductive state, and control returns over again until terminal B changes into the "L" level, and the program proceeds to the normal control when terminal B changes to the "L" lever (YES).

When the working confirmation of the actuator 65 has been completed as mentioned above, the cruise lamp 83 is lit at the time of cancelling the setting signal subsequent to the input of the setting signal into the control means of the microcomputer 74 by setting the setting switch of the command switch 63, the pulse number according to the car-speed at this time is memorized by the car-speed memorizing means in the microcomputer 74. The control means in the microcomputer 74 actuates the clutch-driving circuit 76 and changes the electromagnetic clutch 65b in the actuator 65 into the excited state, so that the throttle 64 is enabled to be opened and closed by the rotation of the driving motor 65a in the actuator 65.

In this state, a motor driving signal in response to the pulse number memorized in the car-speed memorizing means is output form the control means in the microcomputer 74, the motor-driving circuit 75 rotates the driving motor 65a of the actuator 65 according to said motor driving signal, and so the throttle 64 is maintained in the proper position through the electromagnetic clutch 65b and the throttle wire 200. In such a manner, the throttle 64 is maintained at the proper position without operating the accelerator pedal and the motor vehicle can travel at a constant traveling speed.

At this time, the control means in the microcomputer 74 compares the pulse number proportional to the actual car-speed from the car-speed sensor 62 with the pulse number memorized by the car-speed memorizing means in the microcomputer 74 (memorized car-speed), outputs the motor driving signal in response to the difference between said actual and memorized car-speeds into the motor-driving circuit 75, and rotates the driving motor 65a of the actuator 65 in the opening or the closing direction of the throttle 64 in order to maintain the car-speed constant.

Therefore, even if the automatic car-speed controller 61 develops trouble such that the first limit switch 65c to detect the full-closed position of the throttle 64 of the actuator 65 is kept in the open state, it is possible to detect the trouble in advance of the operation of said car-speed controller 61. Accordingly, said car-speed controller 61 never falls into a state in which the throttle 64 becomes impossible to return in the closing direction of the throttle 64 under the car-speed control.

As mentioned above, the automatic car-speed controller according to this invention comprises a car-speed sensor for outputting car-speed data proportional to an actual car-speed, a command switch for outputting a cruise command signal, a car-speed memorizing means for memorizing the car-speed data of said car-speed sensor in response to an operation of said command switch, a motor driven actuator provided with a driving motor for driving a throttle by rotation of said driving motor through an electromagnetic clutch, a motor-driving means for rotating the driving motor of said actuator in the forward and reverse directions, a clutch-driving means for switching said electromagnetic clutch on or off, a control means for controlling said respective driving means in accordance with the difference between actual car-speed and memorized car-speed, and a prohibition means for preventing the rotation of the driving motor of said actuator in the accelerating direction when car-speed control is cancelled or some abnormality arises in said car-speed memorizing means, the control means, the respective driving means or the electromagnetic clutch. Therefore, if the actuator tries to rotate in the opening direction of the throttle due to some abnormality in the car-speed memorizing means, the control means or the like in addition to the bonding of the electromagnetic clutch by any possibility, it is possible to prevent the abrupt acceleration having no relation to the intention of driver because the rotation of the driving motor of the actuator in the opening direction of the throttle is inhibited as a minimum by the prohibition means. Accordingly, an excellent effect can be obtained since it is possible to inexpensively improve reliability of the system over that of a conventional car-speed controller.

Furthermore, the automatic car-speed controller according to this invention comprises a car-speed sensor for outputting car-speed data proportional to an actual car-speed, a command switch for outputting a cruise command signal, a car-speed memorizing means for memorizing the car-speed data of said car-speed sensor in response to an operation of said command switch, a motor driven actuator provided with a driving motor for driving a throttle by rotation of said driving motor through an electromagnetic clutch, and provided with a first limit switch to detect the full-closed position of the throttle and a second limit switch to detect the full-opened position of said throttle for shutting off an electric current to the driving motor by detecting arrival of the throttle into the full closed or full opened position with said respective limit switch, a control means for controlling said actuator in accordance with the difference between actual car-speed and memorized car-speed, and a discrimination means for detecting whether the first limit switch to detect the full-closed position of the throttle is normal or not by driving said actuator within a range in which said throttle remains at the full-closed position due to slack between the actuator and the throttle. Therefore, if the first limit switch of the actuator to detect the full-closed position of the throttle is kept in the open state as a result of some trouble by any possibility, the trouble is detected without driving the throttle in the opening direction and it is possible to prevent the throttle from reaching a state in which the throttle becomes impossible to be returned in the closing direction at the time of automatic car-speed control. The excellent effect is obtained since it is possible to improve the reliability of the system remarkably.

We claim:

1. An automatic car-speed controller comprising:
   a car-speed sensor means for sensing an actual car-speed and outputting car-speed data proportional to said actual car-speed;
   a command switch means for outputting a cruise command signal;
   a car-speed memorizing means for memorizing the car-speed data output from said car-speed sensor means in response to an operation of said command switch means;
   a motor driven actuator means provided with a motor means for driving a throttle means by rotation of said motor means through a clutch means, and provided with a first switch means to detect a full-closed position of said throttle means and change into an OFF-state and a second switch means to detect a full-opened position of said throttle means and change into an OFF-state for shutting off an electric current to said motor means upon detecting arrival of the throttle means into one of the full-closed and full-opened positions;

a control means for controlling said actuator means in accordance with a difference between actual car-speed and memorized car-speed; and a discrimination means for detecting normality of said first switch means by determining that said first switch means changes to an ON-state from the OFF-state when driving said actuator means within a range in which said throttle means remains at the full-closed position due to slack between the actuator means and the throttle means.

* * * * *